US009477905B2

(12) United States Patent
Liu et al.

(10) Patent No.: US 9,477,905 B2
(45) Date of Patent: *Oct. 25, 2016

(54) IMAGE CONGEALING VIA EFFICIENT FEATURE SELECTION

(71) Applicant: General Electric Company, Schenectady, NY (US)

(72) Inventors: Xiaoming Liu, Schenectady, NY (US); Peter Henry Tu, Niskayuna, NY (US); Ya Xue, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/798,160

(22) Filed: Jul. 13, 2015

(65) Prior Publication Data

US 2015/0324663 A1 Nov. 12, 2015

Related U.S. Application Data

(63) Continuation of application No. 14/323,813, filed on Jul. 3, 2014, now Pat. No. 9,082,043, which is a continuation of application No. 13/346,479, filed on Jan. 9, 2012, now Pat. No. 8,774,513.

(51) Int. Cl.
*G06K 9/62* (2006.01)
*G06K 9/00* (2006.01)
*H04N 9/07* (2006.01)

(52) U.S. Cl.
CPC ......... *G06K 9/6206* (2013.01); *G06K 9/00281* (2013.01); *G06K 9/623* (2013.01); *G06K 9/6224* (2013.01); *G06K 9/6263* (2013.01)

(58) Field of Classification Search
CPC ....................................................... G06K 9/00

USPC ........ 382/164, 171, 173, 179, 215; 711/206, 711/208, 209; 348/267
See application file for complete search history.

(56) References Cited

U.S. PATENT DOCUMENTS

| 5,629,988 | A | 5/1997 | Burt et al. |
|---|---|---|---|
| 6,020,930 | A | 2/2000 | Legrand |
| 7,035,434 | B2 | 4/2006 | Estevez |
| 7,085,409 | B2 | 8/2006 | Sawhney et al. |
| 7,274,803 | B1 | 9/2007 | Sharma et al. |
| 7,711,155 | B1 | 5/2010 | Sharma et al. |
| 7,742,623 | B1 | 6/2010 | Moon et al. |
| 7,898,522 | B2 | 3/2011 | Hildreth et al. |

(Continued)

OTHER PUBLICATIONS

Antoniak, Charles, Mixtures of Dirichlet Processes with Applications to Bayesian Nonparametric Problems, Annals of Statistics, 2:1152-1174, 1974, California.

(Continued)

*Primary Examiner* — Abolfazl Tabatabai
(74) *Attorney, Agent, or Firm* — Jean K. Testa; Fletcher Yoder, P.C.

(57) ABSTRACT

A novel technique for unsupervised feature selection is disclosed. The disclosed methods include automatically selecting a subset of a feature of an image. Additionally, the selection of the subset of features may be incorporated with a congealing algorithm, such as a least-square-based congealing algorithm. By selecting a subset of the feature representation of an image, redundant and/or irrelevant features may be reduced or removed, and the efficiency and accuracy of least-square-based congealing may be improved.

20 Claims, 10 Drawing Sheets

(56) References Cited

U.S. PATENT DOCUMENTS

| | | | |
|---|---|---|---|
| 7,912,246 | B1 | 3/2011 | Moon et al. |
| 7,921,036 | B1 | 4/2011 | Sharma et al. |
| 7,930,204 | B1 | 4/2011 | Sharma et al. |
| 7,974,869 | B1 | 7/2011 | Sharma et al. |
| 7,987,111 | B1 | 7/2011 | Sharma et al. |
| 8,009,863 | B1 | 8/2011 | Sharma et al. |
| 8,027,521 | B1 | 9/2011 | Moon et al. |
| 8,098,888 | B1* | 1/2012 | Mummareddy ... G06K 9/00778 382/103 |
| 8,442,330 | B2* | 5/2013 | Tong ............... G06K 9/00228 382/118 |
| 8,484,083 | B2* | 7/2013 | Basu ................ G06Q 30/02 705/14.66 |
| 8,774,513 | B2 | 7/2014 | Liu et al. |
| 9,082,043 | B2* | 7/2015 | Liu .................... G06K 9/6263 |
| 2002/0138830 | A1 | 9/2002 | Nagaoka et al. |
| 2005/0198661 | A1 | 9/2005 | Collins et al. |
| 2007/0271580 | A1 | 11/2007 | Tischer et al. |
| 2008/0109397 | A1 | 5/2008 | Sharma et al. |
| 2009/0217315 | A1 | 8/2009 | Malik et al. |
| 2009/0285456 | A1 | 11/2009 | Moon et al. |

OTHER PUBLICATIONS

Baker, Simon, et al., Lucas-Kanade 20 years on: A Unifying Framework; IJCV, 56(3):221-255, Mar. 2004, Pittsburgh, PA.

Baker, Simon, et al., Automatic Construction of Active Appearance Models as an Image Coding Problem; IEEE Transactions of Pattern Analysis and Machine Intelligence. 26(10): 1380-1384, Oct. 2004, Pittsburgh, PA.

Blei, David M., et al., Variational Methods for the Dirichlet Process, International Conference on Machine Learning, 2004, Berkeley, CA.

Chang, Kyong I. et al., An Evaluation of Multimodal 2D+3D Face Biometrics, IEEE Transactions of Pattern Analysis and Machine Intelligence, 27(4): 619-624, 2005.

Cox, Mark et al., Least Squares Congealing for Unsupervised Alignment of Images, in CVPR, 2008, Pittsburgh, PA.

Cox, Mark et al., Least-Squares Congealing for Large Numbers of Images, Conference on Computer Vision and Pattern Recognition, 2009.

Dy, Jennifer G. et al., Feature Subset Selection and Order Identification for Unsupervised Learning, International Conference on Machine Learning, pp. 247-254, 2000, Lafayette, IN.

He, Xiaofei et al., Laplacian Score for Feature Selection, Advances in Neural Information Processing Systems, 2005.

John, George H., et al., Irrelevant Features and the Subset Selection Problem, International Conference on Machine Learning, pp. 121-129, 1994, California.

Learned-Miller, Erik G., Data Driven Image Models Through Continuous Joint Alignment, IEEE Transaction of Pattern Analysis and Machine Intelligence, 28(2): 236-250, Feb. 2006.

Liu, X., et al., Facial Contour Labeling Via Congealing, In ECCV, 2010.

Miller, Erik G., et al., Learning From One Example Through Shared Densities on Transforms, IEEE Conference on Computer Vision and Pattern Recognition, vol. 1, pp. 464-471, 2000.

Mitra, P., et al., Unsupervised Feature Selection Using Similarity, IEEE Transactions of Pattern Analysis and Machine Intelligence, 24:301-312, 2002.

Storer, Markus, et al., Intensity-Based Congealing for Unsupervised Joint Image Alignment, International Conference on Pattern Recognitions, pp. 569-576, 2010.

Tong, Yan, et al., Automatic Facial Landmark Labeling with Minimal Supervision, International Conference on Computer Vision and Pattern Recognition, 2009.

Zhao, Zheng, et al., Special Feature Selection for Supervised and Unsupervised Learning, International Conference on Machine Learning, pp. 1151-1157, 2007.

* cited by examiner

| DATASET | #(INSTANCES) | #(FEATURES) | #(CLASSES) |
|---|---|---|---|
| SEMEION | 1593 | 256 | 10 |
| ARRHYTHMIA | 452 | 279 | 16 |
| MADELON | 4400 | 500 | 2 |
| ISOLET | 7797 | 617 | 26 |
| MFEAT | 2000 | 649 | 10 |
| GISETTE | 13500 | 5000 | 2 |

IMAGE CONGEALING VIA EFFICIENT FEATURE SELECTION

CROSS-REFERENCE TO RELATED APPLICATION

This application is a continuation of U.S. application Ser. No. 14/323,813 entitled "Image Congealing Via Efficient Feature Selection," filed on Jul. 3, 2014, which is a continuation of U.S. application Ser. No. 13/346,479 entitled "Image Congealing Via Efficient Feature Selection," filed on Jan. 9, 2012, both of which are hereby incorporated by reference in their entirety.

STATEMENT REGARDING FEDERALLY SPONSORED RESEARCH & DEVELOPMENT

This invention was made with Government support under grant number 2009-SQ-B9-K013 awarded by the National Institute of Justice. The Government has certain rights in the invention.

BACKGROUND

The present disclosure relates generally to image congealing, and more particularly, to a feature selection method for image congealing.

Group-wise image alignment, also known as "congealing", is a process of jointly estimating warping parameters for all images in an ensemble. There are many applications of image congealing. During the learning phase of an object detector, the position of the object (e.g., a face, pedestrian, or car) for training images can be automatically provided by congealing, rather than by being labeled manually. Congealing can improve appearance-based face recognition performance. For example, automatic labeling of facial landmarks can be enabled by semi-supervised congealing, which can also potentially be used to discover the non-rigid shape deformation of a real-world object.

DRAWINGS

These and other features, aspects, and advantages of the present technique will become better understood when the following detailed description is read with reference to the accompanying drawings in which like characters represent like parts throughout the drawings, wherein.

Figure 8:
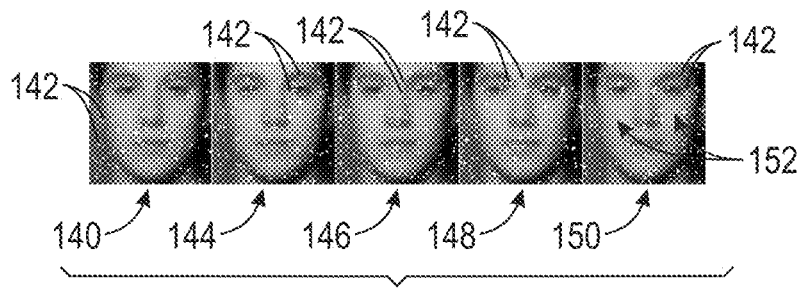
Figure 9:
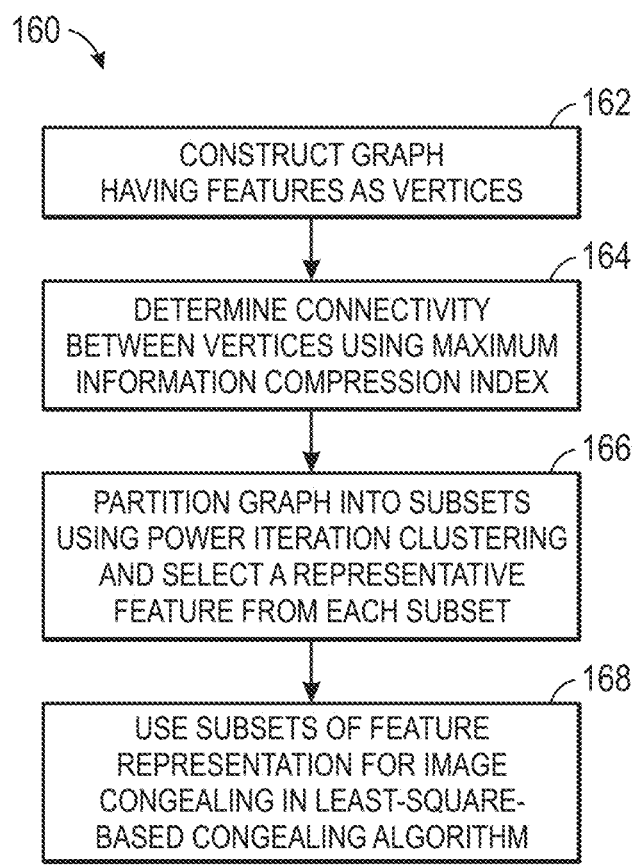

FIG. 8 is an image ensemble illustrating the locations of various selected features at different iterations using an unsupervised feature selection algorithm in accordance with an embodiment of the present disclosure; and FIG. 9 is a method including an unsupervised feature selection algorithm which may be incorporated into a least-square-based congealing algorithm in accordance with an embodiment of the present disclosure.

DETAILED DESCRIPTION

The goal of congealing is to estimate the warping parameters by iteratively minimizing a distance metric computed using the feature presentation of each image. In particular, there are three key elements to image congealing: cost function, optimization method, and feature representation. Certain methods utilize the mutual information as the cost function for optimization, while other methods employ a least-squared distance between image pairs in the ensemble. Regarding the optimization method, the gradient descent and the inverse compositional approach may also be used.

Figures 1, 2:
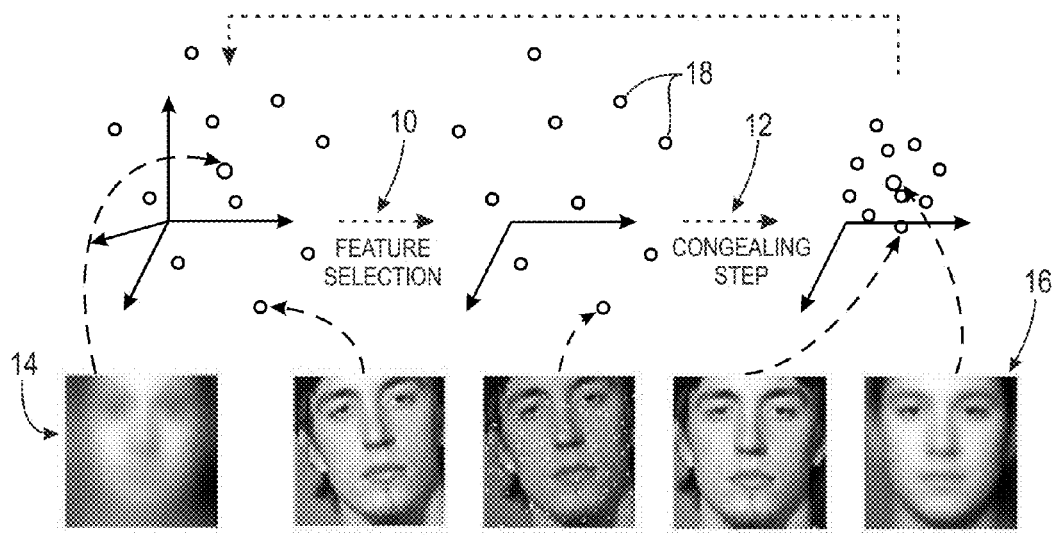
FIG. 1 is a schematic of an image alignment method including an unsupervised feature selection method and a congealing method in accordance with an embodiment of the present disclosure.
FIG. 2 is a table displaying results of an empirical study conducted with an unsupervised feature selection algorithm in accordance with an embodiment of the present disclosure.
Figure 3A:
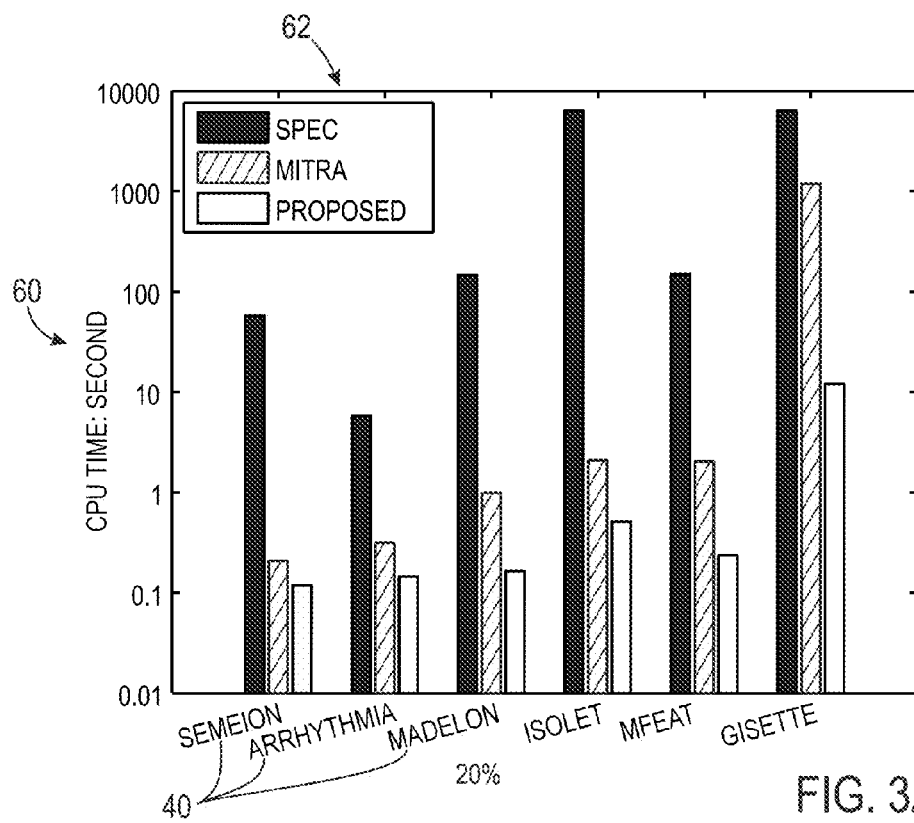
FIGS. 3A-3D are graphs illustrating experimental results comparing the performance of two previously described filter type algorithms with an unsupervised feature selection algorithm in accordance with an embodiment of the present disclosure.
Figure 3B:
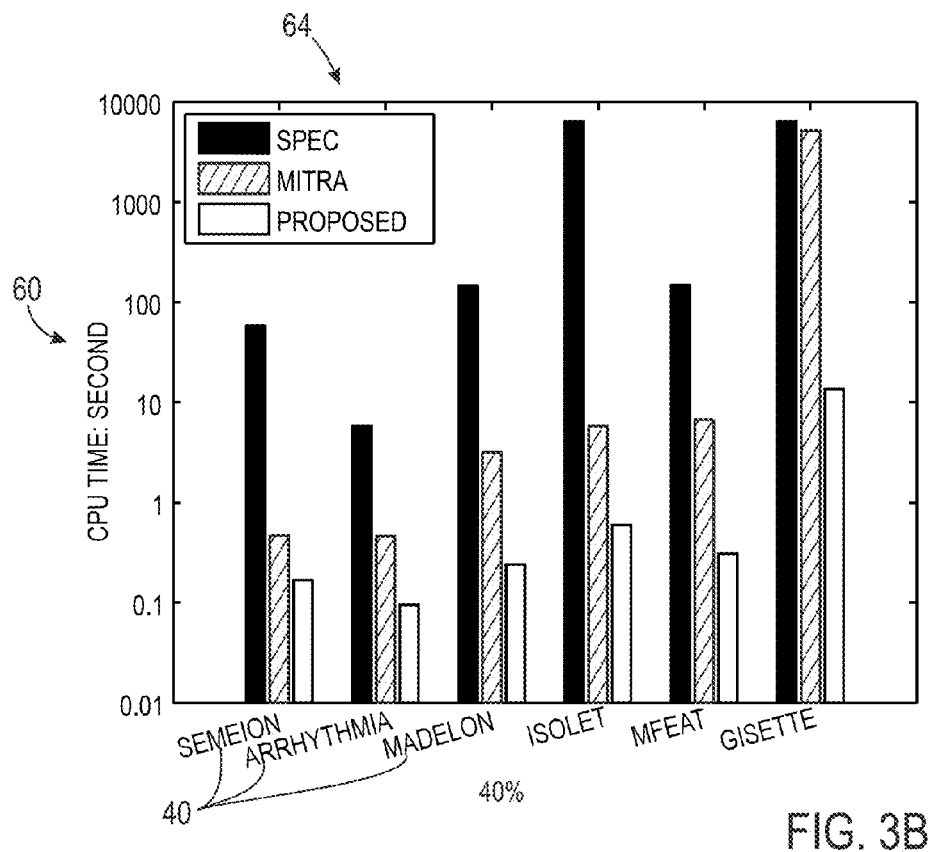
Figure 3C:
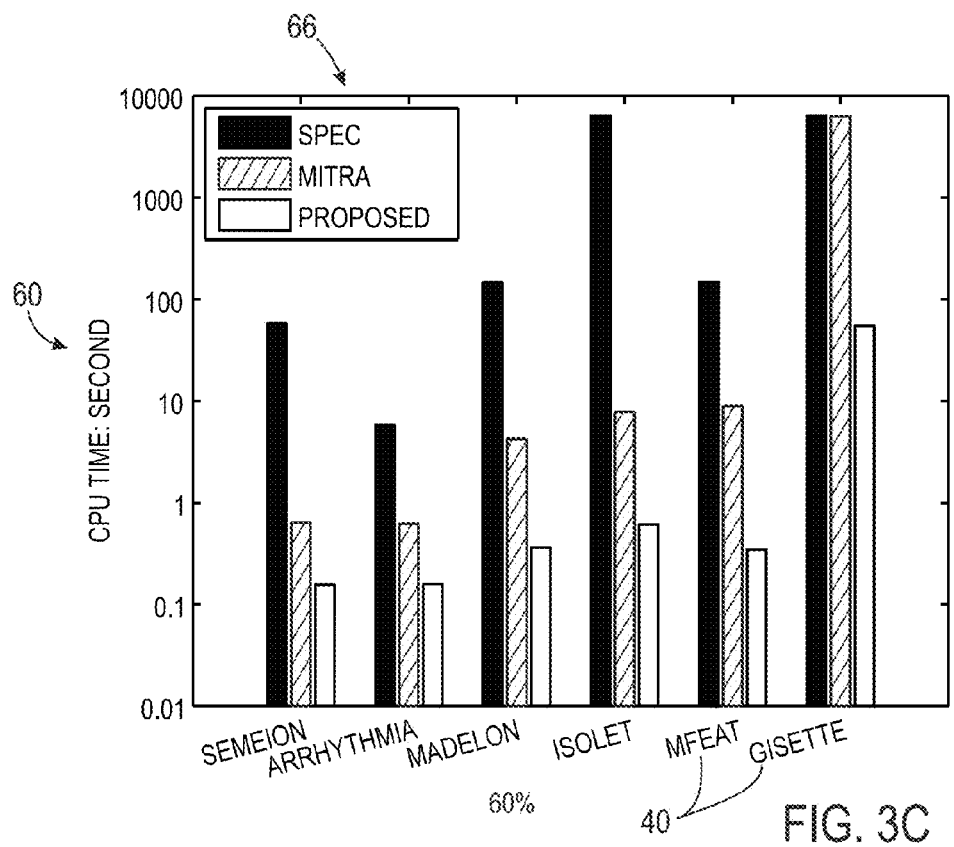
Figure 3D:
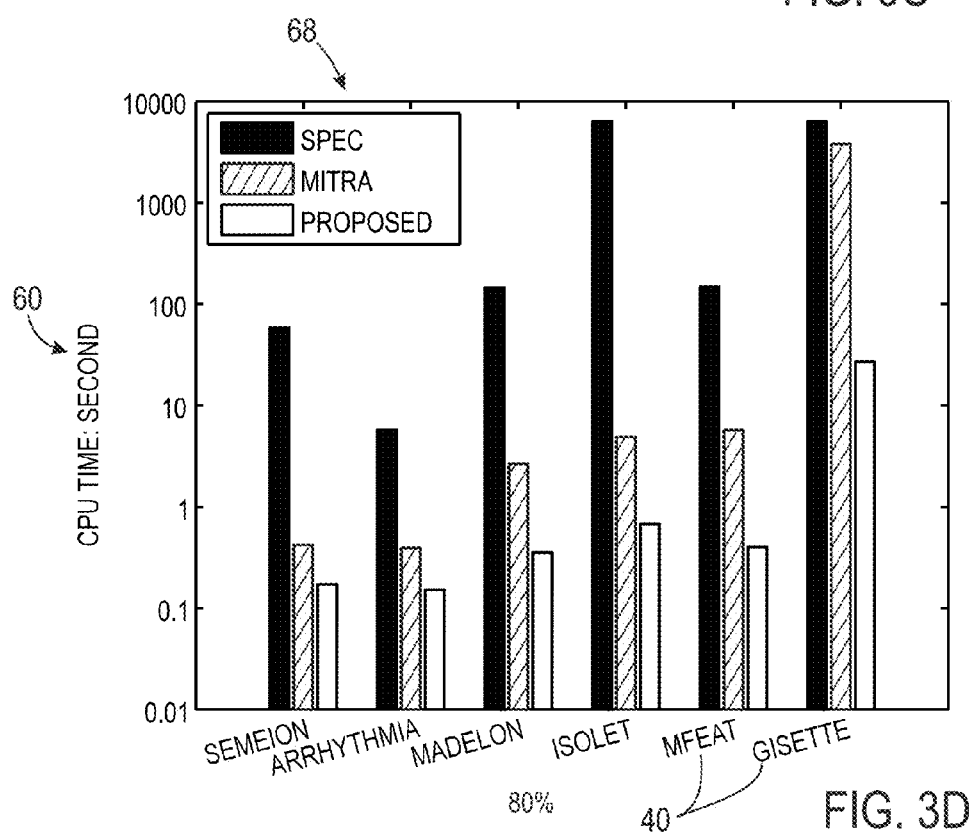
Figure 4A:
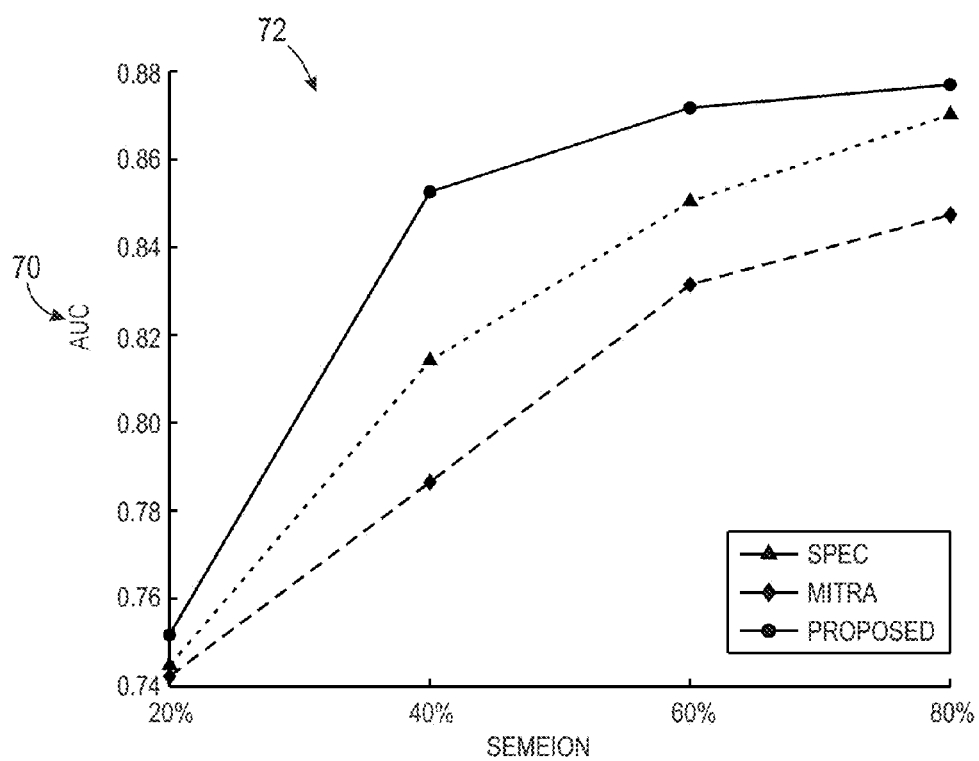
FIGS. 4A-4F are graphs illustrating experimental results comparing the performance of two previously described filter type algorithms with an unsupervised feature selection algorithm in accordance with an embodiment of the present disclosure.
Figure 4B:
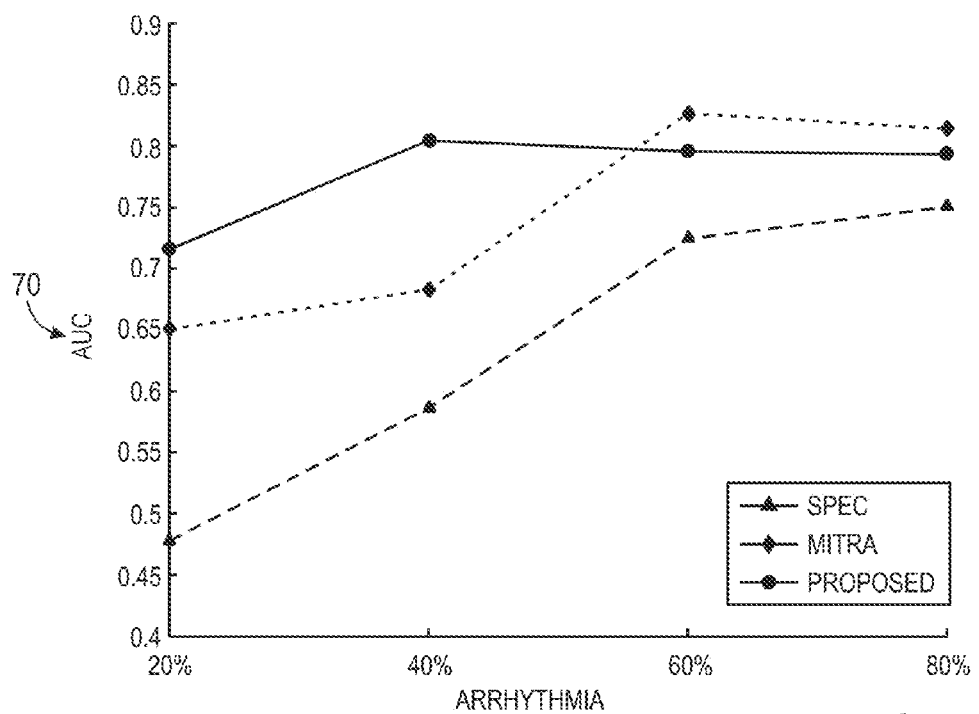
Figure 4C:
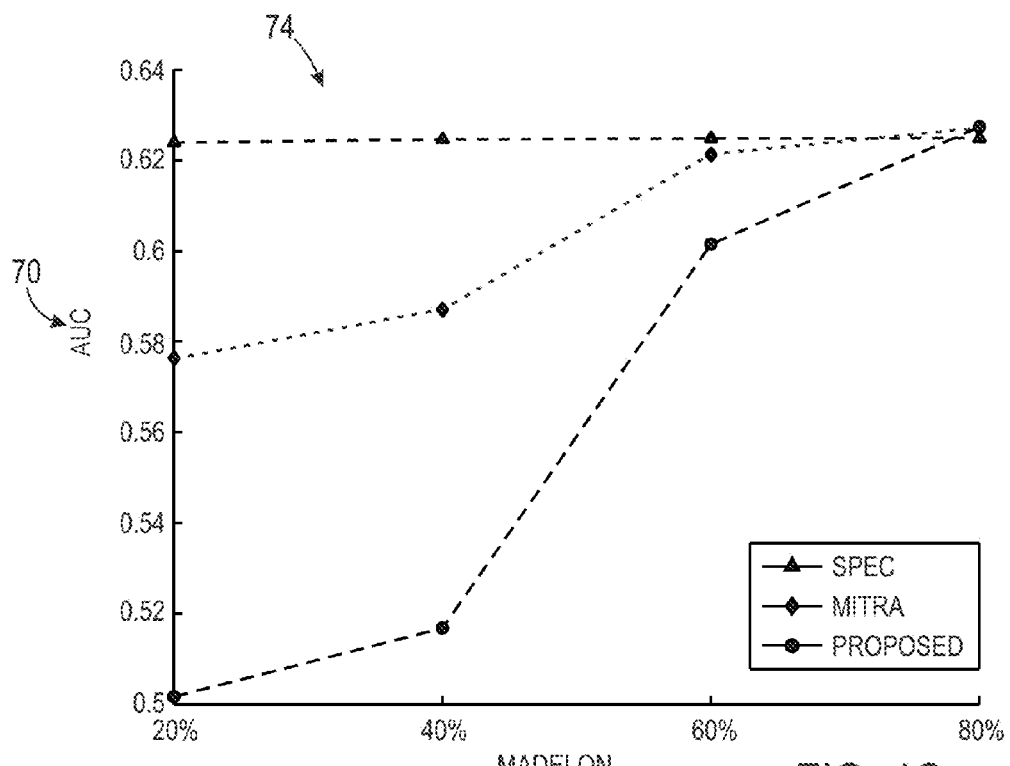
Figure 4D:
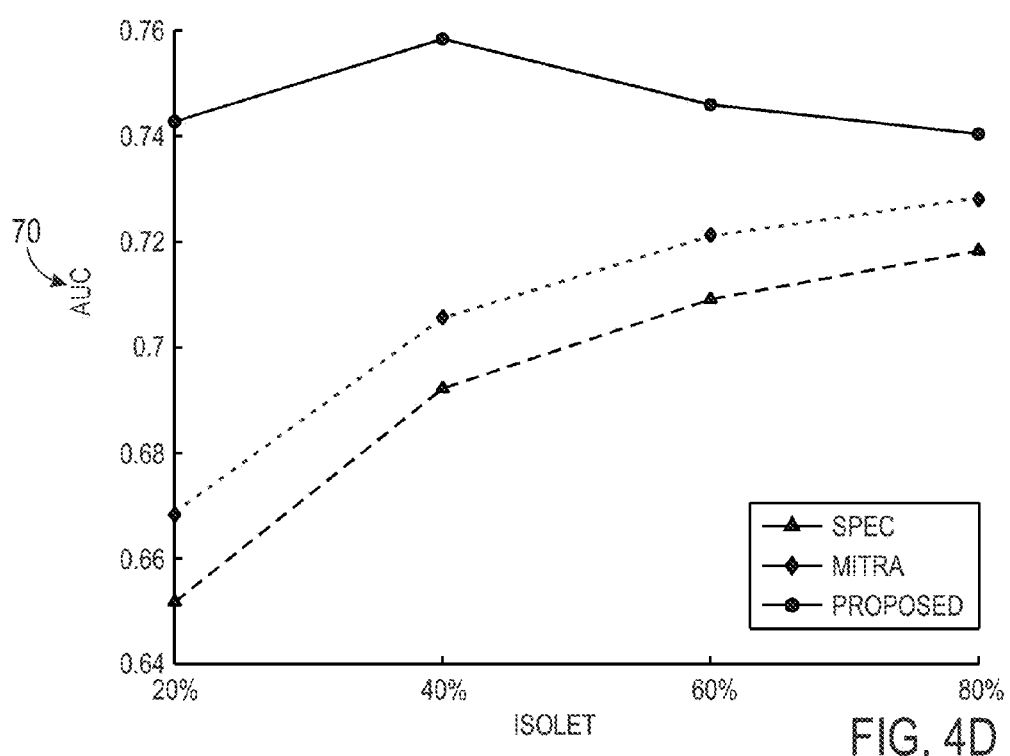
Figure 4E:
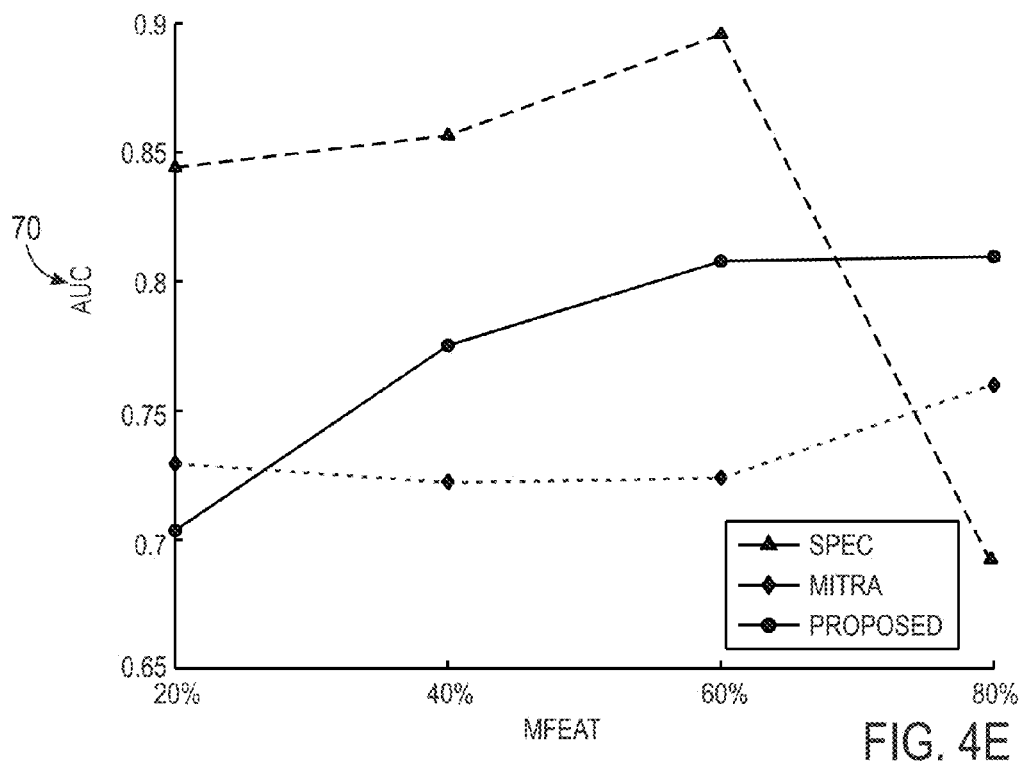
Figure 4F:
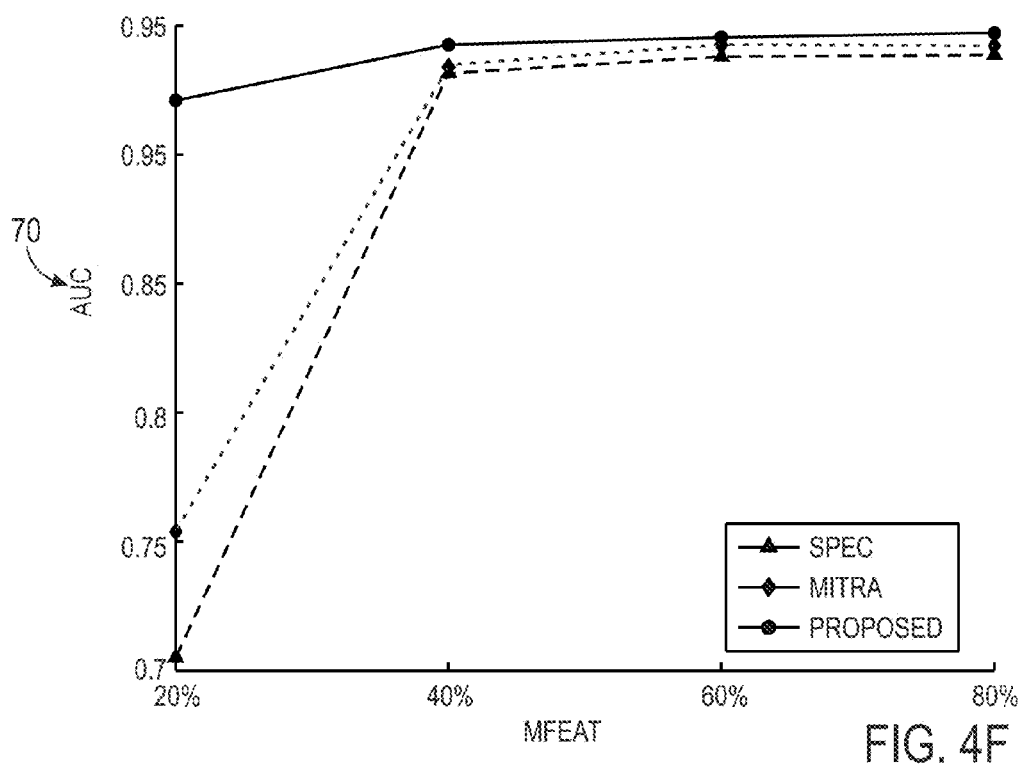

Existing methods may use original image intensities as the feature representation, which has a number of drawbacks. Since such representation usually resides in a high-dimensional space, it imposes a substantial computational burden for optimization, especially with a large image ensemble. Also, because many pixel intensities are redundant due to local proximity to their neighboring pixels, they may hinder the optimization process. To remedy this problem, as shown in FIG. 1, the present techniques include an unsupervised feature selection approach to automatically choose a subset of feature representation and use the subset for image congealing. For example, by using only less than 3% of the original feature representation, both the accuracy and efficiency of congealing may be substantially improved compared to congealing without feature selection. In the illustrated embodiment, an unsupervised feature selection method 10 and congealing algorithm 12 may be applied to a blurred average image 14 to generate an aligned image 16. Specifically, the unsupervised feature selection method 10 and the congealing algorithm 12 use selected features 18, which are a subset of the total feature representation.

In addition to combining feature selection and congealing, the disclosed embodiments also include a novel unsupervised feature selection approach. In other words, the novel unsupervised feature selection may be incorporated with a congealing algorithm (e.g., a least-square-based congealing algorithm). Specifically, a graph having features as the vertices is generated, and the connectivity between the vertices is determined by a maximum information compression index. A simple and fast graph clustering method called power iteration clustering (PIC) is used to partition the graph into subsets and select a representative feature from each subset. As discussed in detail below, the disclosed method has significant advantages in efficiency, especially when the feature dimension is high, while achieving comparable effectiveness in terms of removing feature redundancy. Moreover, the proposed method can be applied to other learning tasks beyond congealing, due to its independence from the objective function and optimization algorithm for the target concept.

There is a long history of group-wise image alignment in computer vision, particularly in the area of medical image analysis. The basic idea of this congealing process is to minimize a cost function by estimating the warping parameters of an ensemble. There are various directions that have been explored to improve the accuracy and efficiency of congealing. In terms of a cost function, some methods utilize a mutual information measurement as an objective function, while other methods use a series of least-squares-based congealing algorithms. In terms of a learning paradigm, there are unsupervised congealing methods, as well as semi-supervised congealing methods. The warping function used to compute pair-wise image distances can be defined as a global affine warp or a sophistical non-rigid wasp. However, it remains unclear what an effective feature representation is in the context of congealing. With only a few exceptions, most existing methods compute the cost function by directly utilizing the original pixel intensities of the image. The congealing algorithm disclosed herein makes a sharp contrast in that it provides a novel feature selection mechanism to effectively choose a subset of the feature representation, which is shown to improve both the accuracy and efficiency of least-squares-based congealing.

The task of feature selection is to remove irrelevant and/or redundant features. Irrelevant features refer to the features that are not informative with respect to the target concept (e.g., class in supervised learning), and redundant features refer to those that are highly correlated to some other features. By removing the irrelevant and redundant features, feature selection helps reduce over fitting and improve efficiency of model learning. It also helps better understand the underlying data-generating mechanism and related physical process patterns.

Feature selection has been well studied in supervised learning. However, relatively little is known about feature selection in unsupervised learning, mainly because the definition of relevance becomes unclear without guidance of class labels. A few approaches have been presented in the literature. These approaches may be categorized into two groups: wrapper and filter. A wrapper method ties feature selection with the main learning task (e.g., classification) and evaluates features by how well they fit the ultimate learning goal. In contrast, a filter method does not rely on the learning algorithm, but rather exploits intrinsic properties of the data structure.

In the first category (e.g., the wrapper method), most unsupervised wrapper techniques use clustering quality or related constructs as feature selection guidance and are customized to a particular clustering algorithm. For example, feature selection may be wrapped around an EM clustering algorithm and both the scatter separability and the maximum likelihood may be measured. Fewer techniques have been found in the second category—the filter type of unsupervised feature selection techniques. Some methods use the Laplacian score to measure features by their power of locality preserving. Other methods use a general feature selection framework evolved from the spectral graph theory and consider the Laplacian score algorithm as a special case of the proposed framework. Another method of feature clustering partitions the features into a number of homogenous subsets according to an information-theory-based similarity measure, and then selects the representative feature for each subset.

For congealing purposes, the disclosed embodiments utilize the filter techniques because clustering may or may not be the ultimate learning objective. Existing filter methods have difficulties with high-dimensional, big datasets, which are common in real-world congealing applications. Therefore, the disclosed techniques include a new filter method, which may be a natural extension of existing congealing algorithms and may be powered by a fast graph clustering approach. The disclosed methods provide a comparable or improved performance of feature selection when independently evaluated on benchmark datasets. When embedded in the congealing algorithm, the advantage of the disclosed feature selection methods becomes clearer: the optimization search space is shrunk by removing redundant features and therefore the computation cost may be reduced by a significant margin.

The Congealing Algorithm

The present embodiments begin with a conventional unsupervised least-squares-based congealing approach. Unsupervised congealing approaches operate on an ensemble of K unaligned images $$I = \{I_i\}_{i=1}^{K},$$

each with an unknown warping parameter $p_i$ that is to be estimated. The parameters $p_i$ can be a simple 6-dimensional affine warping parameter, or the coefficient parameter of a shape subspace. The collection of all unknown parameters is denoted with $P=[p_1, \ldots, p_K]$. The goal of congealing is to estimate P by minimizing a cost function defined on the entire ensemble:

$$\varepsilon(P) = \sum_{i=1}^{K} \varepsilon_i(p_i). \qquad (1)$$

The total cost is the summation of the cost of each image $\epsilon_i(p_i)$ $$\varepsilon_i(p_i) = \sum_{j=1, j \neq i} \|f(I_j, p_j) - f(I_i, p_i)\|^2, \qquad (2)$$

where f(I,p) is a d-dimensional feature representation of image I evaluated a p. Hence, $\epsilon(p_i)$ equals the summation of the pairwise feature difference between $I_i$ and all the other images in the ensemble.

The feature representation may be defined as:

$$f(I,p) \doteq I(W(x;p)), \qquad (3)$$

where W(x;p) is a warping function that takes as input x, which is a collection of all d pixel coordinates within the common rectangle region, and outputs the corresponding pixel coordinates in the coordinate space of image I. Given this warping function, I(W(x;p)) denotes the corresponding warped image feature obtained by bilinear interpolation of the image I using the warped coordinates W(x;p). Since the total cost $\epsilon(P)$ is difficult to optimize directly, the individual cost $\epsilon_i(P_i)$ for each $I_i$ may be iteratively minimized, given an initial estimation of the warping parameter $P_i^{(0)}$. The well-known inverse warping technique is utilized, and after taking the first order Taylor expansion, Equation (2) can be simplified to:

$$\sum_{j=1, j\neq i}^{K} \|b_j + C_j \Delta p_i\|^2, \quad (4)$$

where $$b_i = f(I_j, p_i) - f(I_i, p_i), C_j = \frac{\partial f(I_j, p_j)}{\partial p_j}, \quad (5)$$

The least-square solution of Equation (4) can be obtained by setting the partial derivative of Equation (4) with respect to $\Delta p_i$ equal to zero. We have:

$$\Delta p_i = \left[\sum_{j=1, j\neq i}^{K} C_j^T C_j\right]^{-1} \left[\sum_{j=1, j\neq i}^{K} C_j^T b_j\right]. \quad (6)$$

The calculated $\Delta p_i$ is used to update the current warping parameter, $p_i^{(t)}$:

$$p_i^{(t+1)} \leftarrow p_i^{(t)} + \Delta p_i.$$

Similar updating is conducted for the warping parameters of other images in the ensemble, and then the algorithm proceeds to the next iteration. This process terminates when the difference of $\epsilon(P)$, which is computed using Equation 1, between consecutive iterations is less than a pre-defined threshold.

Unsupervised Feature Selection

The disclosed feature selection approach is designed to remove feature redundancy. More specifically, certain embodiments include an unsupervised feature selection algorithm that is suitable for various learning tasks with different target concepts. As a result, there is not a unified definition of feature relevance.

For example, let $Y=[y_1, y_2, \ldots y_d]$ denote a n-by-d data, where rows are instances and columns are features. The vector $y_j$ includes the jth feature for all the instances. A feature similarity measure may be based on information theory termed the maximum information compression index, which possesses several desirable properties for feature redundancy reduction, such as sensitivity to scaling and invariance to rotation. The feature similarity measure may be defined as follows:

$$\lambda(y_j, y_i) = \quad (8)$$
$$\frac{1}{2}\left[V(y_j) + V(y_i) - \sqrt{(V(y_j) + V(y_i))^2 - 4V(y_j)V(y_i)(1 - \tau(y_j, y_i)^2}\right]$$

Where $\tau$ is the correlation coefficient, $$\tau(y_j, y_i) = \frac{C(y_j, y_i)}{\sqrt{V(y_j)V(y_i)}}$$

with $V(\cdot)$ being the variance of a random variable and $C(\cdot,\cdot)$ being the covariance between two variables. The value of $\lambda$ ranges between 0 and $0.5(V(y_j)+V(y_i))$. It is minimized when two features $y_j$ and $y_l$ are linearly dependent and increases as the dependency diminishes. Based on the measure $\lambda$ for each pair of features, a heuristic algorithm is employed to search the feature space. The heuristic algorithm finds the k nearest neighbors of each feature. Thereafter, the feature with the most compact neighborhood is selected and its neighbors are discarded. The process is repeated until all features are either selected or discarded. The heuristic search algorithm has computational complexity similar to that of a kNN algorithm, which could be slow when the feature dimension is high.

Spectral graph theory may also be used in machine learning applications. For example, spectral clustering algorithms could be used to take place of the heuristic search algorithm. More specifically, for a graph A with features as vertices, the connectivity between vertices can be defined as a function of the measure $\lambda$ in Equation (8). That is:

$$a_{jl} = \exp(-\lambda(y_j, y_l)^2/(2\sigma^2)), j,l=1,\ldots,d, \quad (9)$$

where $\sigma$ is a scaling parameter that controls the kernel width. The degree matrix associated with A, denoted by D, is a diagonal matrix with the diagonal entries equal to the row sums of A. A normalized random-walk Laplacian matrix L is defined as $L=\Delta-D^{-1}A$, where $\Delta$ is the identity matrix. The intrinsic clustering structure is often revealed by representing the data in the basis composed of the smallest eigenvectors of L (but not the very smallest one). The very smallest eigenvector is a constant vector that doesn't have discriminative power.

For another matrix defined as $W=D^{-1}A$, the largest eigenvector of W is the smallest eigenvector of L. A well-known method for computing the largest eigenvector of a matrix is power iteration (PI), which randomly initializes a d-dimensional vector $v^{(0)}$ and iteratively updates the vector by multiplying it with W:

$$v^{(t)} = \gamma W v^{(t-1)}, t=1, 2, \ldots, \quad (10)$$

where $\gamma$ is a normalizing constant to keep $v^{(t)}$ numerically stable. Regarding the largest eigenvector of W, the elements of $v^{(t)}$ converge to local centers corresponding to the clusters in the data before they converge to the constant value. Therefore, the largest eigenvector $v^{(t)}$, which is discarded in spectral clustering algorithms, becomes a useful tool for clustering. The algorithm, known as power iteration clustering (PIC), is very efficient because it only involves iterative matrix-vector multiplications, and clustering the one-dimensional embedding of the original data is a relatively easy task.

As will be appreciated, power iteration clustering may be used to partition the graph with data instances as vertices. However, the present embodiments are directed towards feature clustering and power iteration clustering applied to a graph built on features. Once the embedding vector $v^{(t)}$ is derived, various clustering algorithms can be applied to group the features. To reduce computational cost introduced by the clustering algorithm, a fast k-means algorithm may be used. Furthermore, Dirichlet process mixture models could be used if the number of clusters, i.e., the number of selected features, remains unknown and is considered a model parameter to be estimated as well.

In certain embodiments, the power iteration clustering algorithm may have additional enhancements to increase algorithm stability. For example, power iteration clustering does not work for the following matrix:

$$A = \begin{bmatrix} 0 & 1 & 0.1 & 0 \\ 1 & 0 & 0 & 0.1 \\ 0.1 & 0 & 0 & 1 \\ 0 & 0.1 & 1 & 0 \end{bmatrix}. \quad (11)$$

As will be appreciated, initializing $v^{(0)}$ with the degree vector $u=[u_1, u_2, \ldots, u_d]^T$ can accelerate local convergence where $$u_j = \frac{\sum_i a_{ji}}{\sum_{j,i} a_{ji}}.$$

However, for a matrix like Equation (11), the degree vector is a constant vector and will remain constant during the matrix-vector multiplication process. To address this issue, as well as to assure fast convergence, a small perturbation may be added to the initial vector, i.e., $$v_j^0 = u_j + \epsilon_j, j=1, \ldots, d, \quad (12)$$

where $\epsilon_j$ is a small random number, e.g., uniformly distributed in the interval $(0, 1e^{-2}/d)$. Then $v^{(0)}$ is normalized to sum one. Additionally, the diagonal elements of A may be set to one, as opposed to zero, which may provide better numerical stability.

The overall procedure of the disclosed unsupervised feature selection algorithm may be summarized as follows. The input of the algorithm may be a data matrix $Y=[y_1, y_2, \ldots, y_d]$ and, optionally, a number of features to be selected, k. Next, the similarity between every pair of features is calculated using Equations (8) and (9) above, and the graph A is generated. The matrix W may then be calculated by row normalizing A. Then, $v^{(0)}$ is initialized with Equation (12), as discussed above. The embedding vector $v^{(t)}$ is found with iterative matrix-vector multiplications using Equation (10). The elements of the vector $v^{(t)}$ are then grouped, each element corresponding to one feature, with an efficient clustering algorithm, e.g., the fast k-means. Subsequently, for each cluster, the feature that is closest to the cluster center is found. For example, let $\Omega=\emptyset$ and assume each feature's index is j, where $\Omega=\Omega v\{j\}$. Thereafter, the disclosed unsupervised feature selection algorithm will output the indices of the selected features, $\Omega$.

Congealing with Feature Selection

The unsupervised feature selection method described above may further be incorporated into the unsupervised congealing framework also described above. For example, given the initial warping parameter $P^{(0)}$, the basic unsupervised least-square-based congealing algorithm may proceed with the following iterative steps: 1) computing the warping parameter update $\Delta p_i$ for each image, and 2) updating the current warping parameter for each image. The presently disclosed algorithm follows these same steps, except the present feature representation is only a subset of the original presentation. Specifically, the present feature representation is defined as:

$$f(I,p) \doteq I(W(x(\Omega);p)), \quad (13)$$

where $\Omega$ is the output of the unsupervised feature selection method describe above, and is a k-dimensional vector containing the indices of selected features.

There are several aspects regarding this enhanced congealing algorithm. First, although being similar to the case of original representations, the calculation of $b_j$ and $C_j$ is more efficient because only the feature elements with indices included in $\Omega$ need to be computed. Second, the unsupervised feature selection is conducted at every iteration, because, as the alignment for all images changes at each iteration, the corresponding visual features also change, which suggests that a distinctive subset of features might be useful at different stages of the entire iterations. Third, the same iteration termination condition as the basic congealing algorithm is utilized. That is, the image difference (see Equation (1)) is evaluated using the original feature representation, which may be appropriate because different feature selections are conducted at consecutive iterations. Finally, the disclosed congealing algorithm is not limited to the feature representation in Equation (13), which is an algorithmic choice given the original intensity feature in Equation (3). Indeed, the disclosed feature selection method is applicable to other feature types, such as regional histograms.

As will be appreciated, unsupervised least-square-based congealing may have a computational complexity $O(mK^2d)$, where m is the dimension of the warping parameter and d is the dimension of the feature representation. Given that the efficiency of congealing depends linearly on the feature dimension, the disclosed algorithm has potential to improve efficiency by working on a much lower feature dimension k, where k<<d. This improved efficiency is discussed in further detail below.

Experimental Data

The proposed feature selection algorithm was compared to existing, state-of-the-art methods. Additionally, the unsupervised congealing algorithm was evaluated with the feature selection. In the following experiments, all algorithms were run single threaded on a conventional workstation.

Evaluation of Feature Selection Performance

An empirical study of the proposed feature selection algorithm was conducted on several University of California, Irvine (UCI) machine learning benchmark data sets. The results of this empirical study are provided in the table shown in FIG. 2. Specifically, six UCI data sets 40 were manipulated using the proposed feature selection algorithm. The study utilized a supervised approach to evaluate the quality of selected feature subsets 42. Additionally, ground truth of class labels 44 were inaccessible during the feature selection process and were only used to evaluate classification accuracy. The classifier used was a simple but efficient linear classifier, which does not have parameter-tuning issues and was used for results evaluations in at least one supervised feature selection challenge.

The performance was evaluated at a different number of selected features. Each dataset, with only the selected features, was randomly split into halves: one half for training and the other half for testing. Classification accuracy was measured by Area Under Curve (AUC) and was averaged over 100 random splits. If the data includes M>2 classes, the multi-class classification problem was converted into M one-against-all binary classification problems and their average AUC is reported.

The presently described experiments compared three unsupervised feature selection algorithms of the filter type. Specifically, the "Mitra" algorithm described in (P. Mitra, S. Member, C. A. Murthy, and S. K. Pal. Unsupervised feature selection using feature similarity. *IEEE T-PAMI*, 24:301-312, 2002. 2, 3, 5), the "SPEC" algorithm described in C. Antoniak. Mixtures of Dirichlet processes with applications to Bayesian nonparametric problems. *Annals of Statistics*, 2: 1152-1174, 1974. 4, and the proposed algorithm were compared. All three algorithms were implemented in non-optimized Matlab™ code. The experiments were run with the default parameter settings in the original code. To make a fair comparison in efficiency, the same code was used to compute the measure $\lambda$ in Equation (8) for both the Mitra and the proposed algorithm.

FIGS. 3A-3D and 4A-4F illustrate the results of the experiments described above. More specifically, FIGS.

3A-3D illustrate the experimental results in terms of CPU time 60, and FIGS. 4A-4F illustrate the experimental results in terms of AUC 70. For example, FIG. 3A includes a first graph 62 that illustrates the performance of the proposed feature selection algorithm, the Mitra algorithm, and the SPEC algorithm with 20% of the original feature dimension. Similarly, FIG. 3B includes a second graph 64 that illustrates the performance with 40% of the original feature dimension, FIG. 3C includes a third graph 66 that illustrates the performance with 60% of the original feature dimension, and FIG. 3D includes a fourth graph 68 that illustrates the performance and 80% of the original feature dimension. The proposed method shows superior efficiency in the comparison of CPU time 60 for feature selection. For example, the proposed method runs less than one minute even for a high dimensional dataset 40, such as gisette (5000 features). Taking 20% (i.e., graph 62 of FIG. 3A) as example, the CPU times 60 averaged over six datasets 40 are 2192 seconds for SPEC, 200 seconds for Mitra, and 2 seconds for the proposed algorithm discussed above.

Classification accuracy for the feature subset selected by the present algorithm is comparable to, if not better than, that for the other two algorithms (e.g., the Mitra and SPEC algorithms), as shown in FIGS. 4A-4F. For example, FIG. 4A includes a first graph 72 which illustrates the performance of the proposed feature selection algorithm, the Mitra algorithm, and the SPEC algorithm for the semeion dataset 40. The additional graphs in FIGS. 4B-4F show the performance of the three compared algorithms for other datasets 40.

Figures 5, 6A:
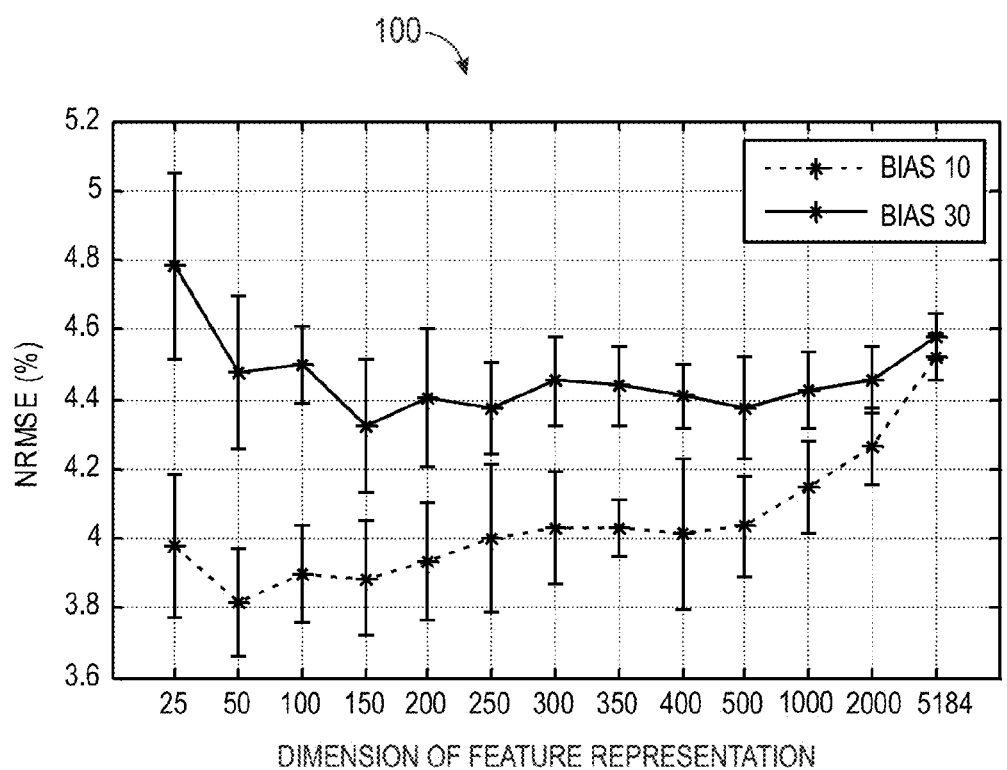
FIG. 5 is a table displaying results of a comparison between a previously described filter type algorithm with an unsupervised feature selection algorithm in accordance with an embodiment of the present disclosure.
FIGS. 6A-6D are graphs illustrating congealing accuracy and efficiency over various feature dimensions using a congealing algorithm having an unsupervised feature selection algorithm in accordance with an embodiment of the present disclosure.
Figure 6B:
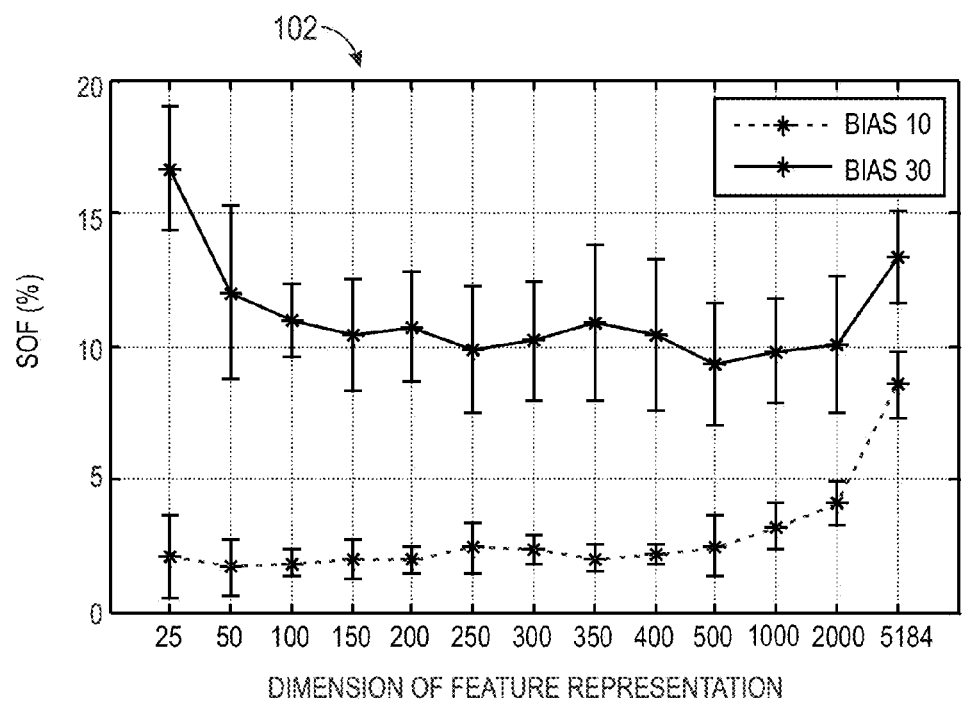
Figure 6C:
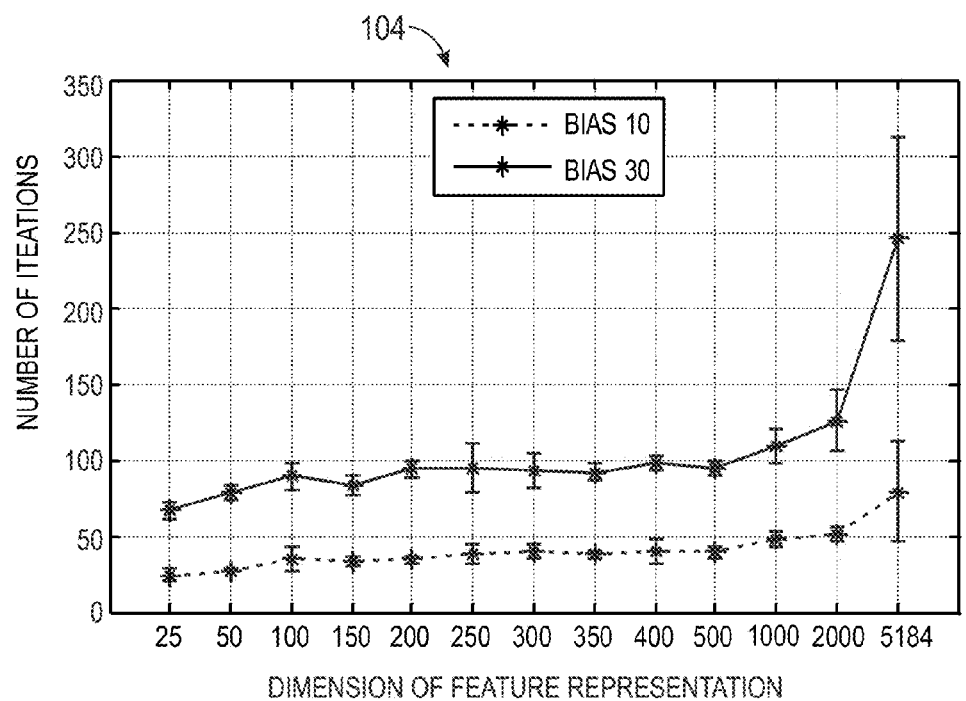
Figure 6D:
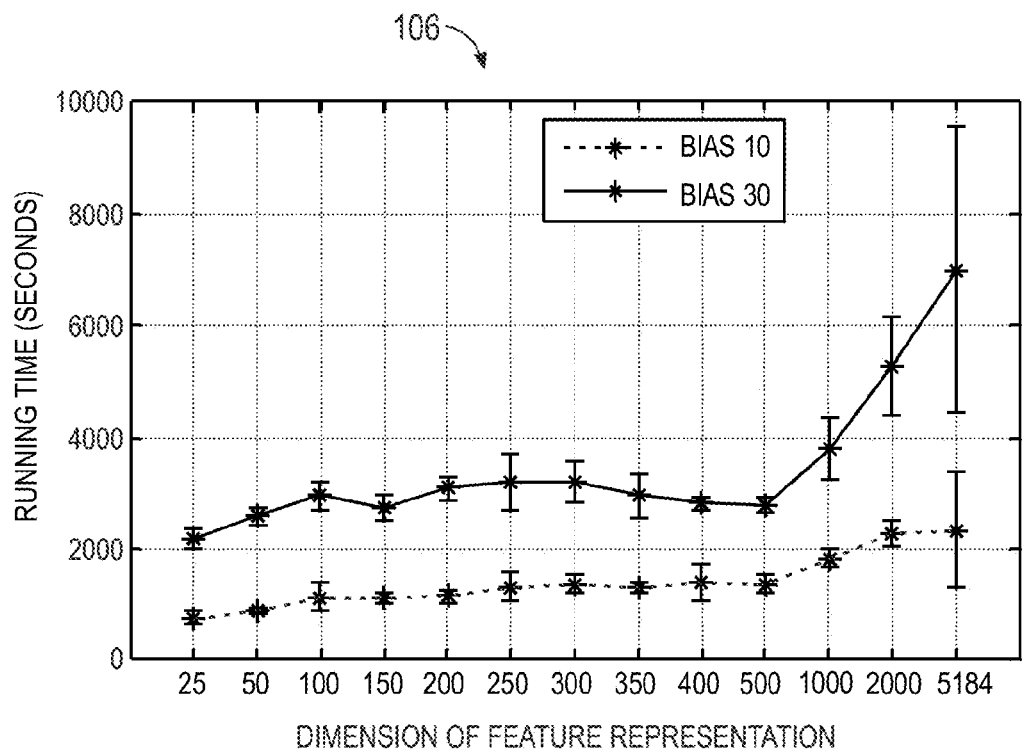

Furthermore, FIG. 5 includes a table 80 showing relative AUC increase averaged over size UCI datasets 40 and comparing the proposed algorithm (e.g., $AUC_P$) with the Mitra algorithm (e.g., $AUC_M$). The two algorithms only differ in the feature clustering part. As shown, with power iteration clustering, not only is efficiency improved, but feature selection quality is improved as well.

Referring back to FIG. 4C, madelon (e.g., illustrated in graph 74) illustrates a special dataset 40 in that among its 500 features, only 20 are real features and all remaining features are distracter features having no predictive power. Since the indices of the real features are unknown, it is suspected that the SPEC algorithm has the real features ranked among the top 20%, and therefore, its AUC keeps almost no change as more features are added in. The other two algorithms (e.g., the Mitra algorithm and the proposed algorithm) aim to remove feature redundancy, and it is likely that they are not able to capture those relevant features when the feature grouping is coarse.

Evaluation of the Congealing Algorithm

Having demonstrated the effectiveness of the proposed feature selection algorithm, the contribution of the proposed feature selection algorithm to image congealing may be considered. In the presently described experiments, 300 images from the Notre Dame (ND1) database were collected. For each image, 33 landmarks (û) were manually labeled to establish a ground truth and to enable a quantitative evaluation for the congealing performance. During initialization, a uniformly distributed random noise $\eta \in [-\eta_{max}, \eta_{max}]$ was added to the ground-truth value $\hat{u}_{i,j}$ as follows:

$$u_{i,j} = \hat{u}_{i,j} - \frac{\eta \rho_i}{\bar{\rho}}, \quad (14)$$

where $\rho_i$ is the eye-to-eye pixel distance of $I_i$, and $\bar{\rho}$ is the average of $\rho_i$ for all images ($\bar{\rho} \approx 130$ pixels in the described experiments). By doing so, the different levels of deviation in the initialization may be synthesized, which is also relative to the face size. The correspondence between the perturbed landmarks and the average landmarks in the common mean shape were used to generate the initial estimation of warping parameters $P^{(0)}$ for all images. In practical applications, the initial landmark positions can be obtained from a face detector. A six-parameter affine warp was employed as W(x;p). A 72-by-72 square region was used as the common mean shape in the present experiments, which results in a 5184-dimensional representation for the original feature I(W(x;p)). As similarly mentioned above, the present algorithm was implemented in Matlab™.

The accuracy of the algorithms was evaluated using two criteria: (1) Normalized Root Mean Squared Error (NRMSE) of landmarks defined as the RMSE with respect to the ground truth landmarks divided by the eye-to-eye distance $\rho_i$, and expressed as a percentage; and (2) Sample "Outliers" Fraction (SOF) defined as the number of images, of which the NRMSE exceeds a threshold (e.g., 8%), versus the total number of images. A smaller NRMSE indicates a higher congealing accuracy, and a smaller SOF represents greater robustness. In addition, the efficiency of the algorithms was evaluated by the number of iterations to converge and the CPU time.

By setting $\eta_{max}=10$, the first five random initializations for the 300-image ensemble may be generated. For each initialization, various numbers of features (k) were specified for the congealing algorithm to run. The same process was completed for $\eta_{max}=30$, which may be an extreme case study, because commercial face detectors may only be capable of achieving $\eta_{max}=15$.

FIGS. 6A-6D illustrate the results where each dot and its variance are computed from 5 runs. Specifically, graph 100 (FIG. 6A) and graph 102 (FIG. 6B) illustrate congealing accuracy with various feature dimension k, and graphs 104 (FIG. 6C) and 106 (FIG. 6D) illustrate efficiency with various feature dimension k. As will be appreciated, k=5184 refers to conventional congealing (e.g., congealing without feature selection). From the graphs 100, 102, 104, and 106 shown in FIGS. 6A-6D, a number of observations can be made. For both cases of initialization, there was a large range of selected feature dimensions (e.g., k∈[150.150]), from which the proposed algorithm achieved improved accuracy compared to the algorithm without feature selection (k=5184). In other words, the proposed algorithm is not sensitive to k. Additionally, for both initializations, the new congealing converged in fewer iterations and utilized less CPU time, particularly when k decreased. In the optimal case, when $\eta_{max}=10$, the proposed algorithm reduced the NRMSE from 4.5% to 3.8%, the SOF from 8.7% to 1.8%, and CPU time from 2349 to 912 seconds by merely using 50/5184, or 0.96%, of the original features. Comparing two cases of initialization, the improvement margin of accuracy by the proposed algorithm in $\eta_{max}=30$ was less than that of $\eta_{max}=10$. This is partially due to the fact that the larger deviation at the initialization makes it challenging to converge by using a lower-dimensional feature representation. Hence, in certain embodiments, it may be beneficial to have the feature selection algorithm automatically nominate the optimal k at each congealing iteration.

Figure 7:
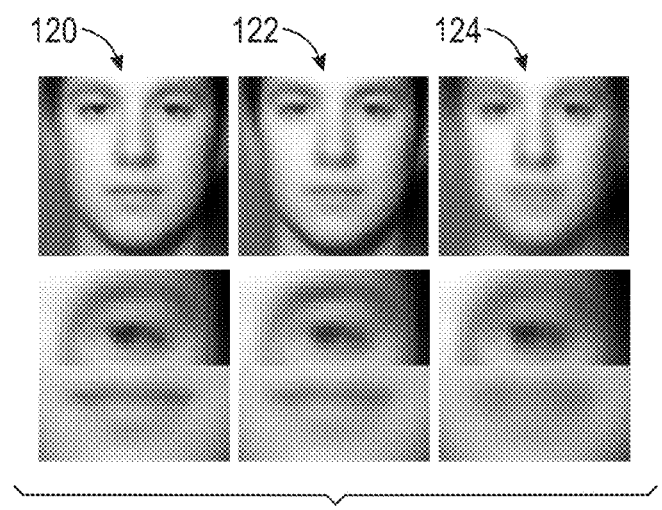
FIG. 7 is an image ensemble comparing various average warped images before and after congealing with various feature selection dimensions in accordance with an embodiment of the present disclosure.

In addition to the quantitative evaluation, the average warped image after congealing converges may be displayed. As will be appreciated, the averaged warped image may be expected to be sharp. For example, FIG. 7 illustrates improved sharpness when comparing k=50 to k=5184. More specifically, images 120 are the average warped images at $\eta_{max}=10$ with k=50 Similarly, images 122 are the average warped images at $\eta_{max}=10$ with k=5184, and images 124 are the average warped images at the initialization. As will be appreciated, improved sharpness can be observed in the eye and mouth regions of images 120, as compared to images 122 and 124.

Furthermore, FIG. 8 illustrates several images which plot the locations of the selected features at five iterations when $\eta_{max}=10$ and k=50. For example, a first image 140 illustrates selected feature locations 142 at iteration #1. Additionally, a second image 144 illustrates selected feature locations 142 at iteration #18, a third image 146 illustrates selected feature locations 142 at iteration #35, a fourth image 148 illustrates selected feature locations 142 at iteration #52, and a fifth image 150 illustrates selected feature locations 142 at iteration #69. At different iterations, distinctive features are selected, many of which are co-located with facial features. For areas with relatively uniform appearance, such as cheeks 152, fewer features are chosen due to higher redundancy.

In summary, the disclosed embodiments include a novel unsupervised feature selection algorithm which may be incorporated into least-square-based congealing algorithms for use in object recognition and detection. For example, FIG. 9 illustrates a method 160, which includes the disclosed techniques. Specifically, as represented by block 162, a graph having features as the vertices is constructed. Thereafter, the connectivity between the vertices is determined by the maximum information compression index, as represented by block 164. The graph is partitioned into subsets using power iteration clustering, and a representative feature is selected from each subset, as represented by block 166. Subsequently, as indicated by block 168, the subsets of the feature representation are used for image congealing. In other words, only a portion of the original feature presentation is used for congealing in a least-square-based congealing algorithm. In this manner, irrelevant and/or redundant features may be reduced or removed from the congealing process.

With the massive image data available for various object classes, image congealing is a key technology to automatically estimate the rigid or non-rigid deformation of the object instances. With an integrated and efficient unsupervised feature selection, the proposed congealing algorithm opens the potential of effectively performing congealing for a large image ensemble, despite the high dimensionality in the original feature representation. For example, with merely 3% of the original features, the proposed congealing algorithm can complete in less than 40% of the time as conventional congealing methods without feature selection, yet still improve the accuracy and robustness of congealing.

What is claimed is:

1. A method, comprising:
 incorporating an unsupervised feature selection algorithm with an image congealing algorithm;
 executing, via a processor, the unsupervised feature selection algorithm to determine representative features of an image; and
 executing, via a processor, the image congealing algorithm to estimate warping parameters for the image using the representative features.

2. The method of claim 1, wherein executing the unsupervised feature selection algorithm comprises constructing a graph having features of the image as vertices.

3. The method of claim 2, comprising predetermining a number of the features.

4. The method of claim 2, wherein executing the unsupervised feature selection algorithm comprises determining a connectivity between the vertices using a maximum information compression index.

5. The method of claim 4, wherein executing the unsupervised feature selection algorithm comprises partitioning the graph into two or more subsets of features using a power iteration clustering algorithm.

6. The method of claim 5, wherein executing the unsupervised feature selection algorithm comprises selecting representative features from each subset of features.

7. The method of claim 5, comprising adding a perturbation to an initial vector of the power iteration clustering algorithm.

8. The method of claim 4, comprising reducing computational cost of the power iteration clustering algorithm by using a fast k-means algorithm.

9. The method of claim 1, wherein executing the image congealing algorithm to estimate warping parameters for the image using the representative features comprises computing warping parameter updates for the image and updating the warping parameters of the image to calculate current warping parameters.

10. The method of claim 1, comprising initially estimating the warping parameters before executing the image congealing algorithm to estimate warping parameters for the image using the representative features.

11. A method, comprising:
 executing, via a processor, an unsupervised feature selection algorithm, comprising:
  inputting a data matrix, where rows of the data matrix comprise instances of an image, and columns of the data matrix comprise features of the image;
  calculating a similarity between each pair of the features;
  generating a graph with the features as vertices of the graph;
  clustering the features of the graph into a plurality of groups; and
  for each of the plurality of groups, selecting a representative feature that is closest to a center of the respective group.

12. The method of claim 11, comprising inputting a desired number of the features with the data matrix.

13. The method of claim 11, comprising incorporating the unsupervised feature selection algorithm with an unsupervised congealing framework.

14. The method of claim 13, wherein the unsupervised congealing framework comprises a least-square-based image congealing algorithm.

15. The method of claim 11, wherein the unsupervised feature selection algorithm comprises a filter-type unsupervised feature selection algorithm.

16. The method of claim 11, wherein clustering the features of the graph into the plurality of groups comprises applying a power iteration clustering algorithm.

17. The method of claim 11, wherein calculating the similarity between each pair of the features comprises applying a heuristic algorithm or a spectral clustering algorithm.

18. A method, comprising:
 executing, via a processor, an unsupervised feature selection algorithm, comprising:
  constructing a graph having features of an image as vertices;
  partitioning the graph into two or more subsets of features; and selecting a representative feature from each of the two or more subsets; and executing an image congealing algorithm to estimate warping parameters for the image using the representative features.

19. The method of claim 18, wherein a number of the representative features is less than 3% of a total number of the features.

20. The method of claim 18, comprising integrating the unsupervised feature selection algorithm with the image congealing algorithm.

* * * * *